(12) United States Patent
Oki et al.

(10) Patent No.: US 7,211,555 B2
(45) Date of Patent: May 1, 2007

(54) PROCESS FOR PREPARING FINE ZEOLITE PARTICLES

(75) Inventors: Kazuo Oki, Wakayama (JP); Hiroji Hosokawa, Wakayama (JP); Mikio Sakaguchi, Wakayama (JP); Hiroshi Kitagaito, Wakayama (JP); Kazuo Taguchi, Wakayama (JP); Hitoshi Takaya, Wakayama (JP)

(73) Assignee: Kao Corporation, Tokyo (JP)

( * ) Notice: Subject to any disclaimer, the term of this patent is extended or adjusted under 35 U.S.C. 154(b) by 54 days.

(21) Appl. No.: 10/954,087

(22) Filed: Sep. 30, 2004

(65) Prior Publication Data

US 2005/0079994 A1   Apr. 14, 2005

Related U.S. Application Data

(62) Division of application No. 09/868,897, filed as application No. PCT/JP00/07874 on Nov. 9, 2000, now Pat. No. 6,831,056.

(30) Foreign Application Priority Data

Nov. 9, 1999 (JP) .................................. 11-318604
Jun. 29, 2000 (JP) ............................. 2000-197076

(51) Int. Cl.
 *C11D 3/08* (2006.01)
(52) U.S. Cl. .................. 510/507; 510/508; 510/511; 510/531; 510/532; 510/443; 510/444; 134/94.1; 134/95.1; 134/99.1; 134/100.1
(58) Field of Classification Search ............... 510/507, 510/508, 511, 531, 532, 443, 444; 134/94.1, 134/95.1, 99.1, 100.1
See application file for complete search history.

(56) References Cited

U.S. PATENT DOCUMENTS

| | | | |
|---|---|---|---|
| 4,102,977 A | 7/1978 | Sugahara et al. | |
| 4,385,042 A | 5/1983 | Whitehurst et al. | |
| 4,481,177 A | 11/1984 | Valyocsik | |
| 4,661,334 A | 4/1987 | Latourrette et al. | |
| 4,741,779 A | 5/1988 | Mita et al. | |
| 5,017,353 A * | 5/1991 | Verduijn | 423/700 |
| 5,166,107 A | 11/1992 | Taga et al. | |
| 6,346,224 B1 * | 2/2002 | Vitale-Rojas et al. | 423/328.2 |

FOREIGN PATENT DOCUMENTS

| | | |
|---|---|---|
| EP | 0 184 244 | 6/1986 |
| EP | 0 288 293 | 10/1988 |
| EP | 0 593 014 | 4/1994 |
| FR | 2 552 070 | 3/1985 |
| GB | 1 297 140 | 11/1972 |
| GB | 2252 305 | 8/1992 |

\* cited by examiner

*Primary Examiner*—Charles Boyer
(74) *Attorney, Agent, or Firm*—Oblon, Spivak, McClelland, Maier & Neustadt, P.C.

(57) ABSTRACT

A process for efficiently preparing fine zeolite particles comprising synthesizing zeolite in the presence of an alkaline earth metal-containing compound and/or with controlling the preparation process of zeolite, thereby giving fine zeolite particles being composed of crystalline aluminosilicate, the fine zeolite particles having a fine average primary particle size, being excellent in the cationic exchange properties and the oil-absorbing ability, having a fine average aggregate particle size, and being excellent in the dispersibility; fine zeolite particles obtainable by the above process; and a detergent composition comprising the fine zeolite particles, the detergent composition being excellent in the detergency.

11 Claims, 4 Drawing Sheets

PROCESS FOR PREPARING FINE ZEOLITE PARTICLES

TECHNICAL FIELD

The present invention relates to a process for preparing fine zeolite particles, fine zeolite particles obtainable by the process, and a detergent composition comprising the fine zeolite particles.

BACKGROUND ART

Zeolite has been utilized for detergent builders as a water-softening agent owing to its ion-exchange properties. The ion exchange properties are greatly dependent on the primary particle size of the zeolite. Since zeolite having a very fine primary particle size is excellent in the ionic exchange speed, it has been known to exhibit a high derging performance.

In addition, there have been known that the fine zeolite particles have the merits of having little deposition on clothes and reducing turbidity, so that the fine zeolite particles are useful as detergent builders.

As a process for preparing such fine zeolite particles, there are given examples in which synthesis is completed under specified feeding composition of the raw materials and reaction conditions (temperature and time), when zeolite is synthesized by mixing sodium aluminate with sodium silicate as disclosed in Japanese Patent Laid-Open Nos. Sho 60-127218 and Sho 62-275016. When very fine zeolite is synthesized by the process as described above, the process has to be carried out under certain restricted conditions in the feeding composition of the raw materials and the reaction conditions, so that there arise problems such as lowered productivity.

There has been reported that the particle size of zeolite is made very fine by adding a soluble hydrocarbon such as saccharose as disclosed in Japanese Patent Laid-Open No. Sho 60-118625. However, when the present inventors have applied this process to the synthesis of zeolite, an effect of reducing a primary particle size could not be found even when adding the soluble hydrocarbon as described above.

On the other hand, the alkaline earth metal is an element which can be easily substituted with Na in zeolite. Therefore, from the viewpoint of the function as an ion-exchangeable cation, there are many cases where the alkaline earth metal is considered to have the same value as the alkali metal. Japanese Patent Laid-Open No. Sho 55-116617 discloses that zeolite is utilized as an adsorbent having heat stability, wherein sodium in zeolite is partly substituted with an alkaline earth metal.

However, there have not yet been any reports describing that an alkaline earth metal is intentionally and positively added during synthesis of zeolite, to give a product which exhibits an excellent function as a water-softening agent, nor any reports describing that the alkaline earth element is an essential element indispensable for making its primary particle size small.

In addition, there has been tried to make the particle size small from the viewpoint of preparation process. For instance, Japanese Patent Laid-Open No. Sho 62-46494 discloses that zeolite is mechanically pulverized by utilizing various kinds of mixing apparatus. However, there is much room for improvement from the viewpoints of the performance of the fine zeolite particles and the production efficiency.

An object of the present invention is to provide a process for efficiently preparing fine zeolite particles comprising synthesizing zeolite in the presence of an alkaline earth metal-containing compound and/or with controlling the preparation process of zeolite, thereby giving fine zeolite particles being composed of crystalline aluminosilicate, the fine zeolite particles having a fine average primary particle size, being excellent in the cationic exchange properties and the oil-absorbing ability, having a fine average aggregate particle size, and being excellent in the dispersibility; fine zeolite particles obtainable by the above process; and a detergent composition comprising the fine zeolite particles, the detergent composition being excellent in the detergency.

The above object and other objects of the present invention will be apparent from the following description.

DISCLOSURE OF INVENTION

Specifically, the present invention relates to:

[1] a process for preparing fine zeolite particles comprising reacting a silica source with an aluminum source in the presence of an alkaline earth metal-containing compound;

[2] a process for preparing fine zeolite particles comprising feeding for reaction an aluminum source and/or a silica source into a circulating line connected to a reaction tank;

[3] the process according to item [1] above, wherein the aluminum source and/or the silica source are fed for reaction into the circulating line connected to the reaction tank;

[4] fine zeolite particles obtainable by the process according to the process of any one of items [1] to [3] above; and

[5] a detergent composition comprising the fine zeolite particles of item [4] above.

BEST MODE FOR CARRYING OUT THE INVENTION

Figure 1:
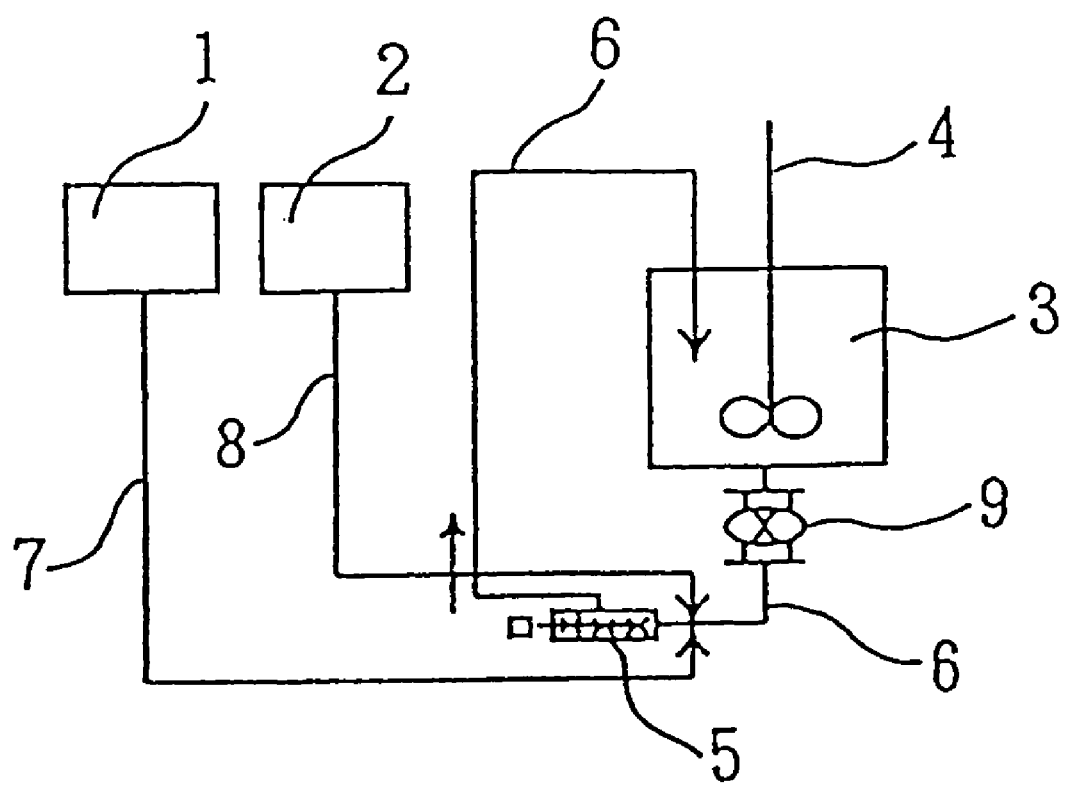
FIG. 1 is a schematic view showing one embodiment of an apparatus for preparing fine zeolite particles according to the present invention.

In the process for preparing fine zeolite particles of the present invention, there are mainly two embodiments. Specifically, the feature of the first embodiment resides in that a silica source is reacted with an aluminum source in the presence of an alkaline earth metal-containing compound. On the other hand, the feature of the second embodiment resides in that an aluminum source and/or a silica source is fed for reaction into a circulating line connected to a reaction tank. In the process for preparing fine zeolite particles of the present invention, the restrictions in the feeding composition for raw materials, reaction conditions, and like can be reduced, whereby the desired fine zeolite particles of the present invention can be efficiently obtained according to this process.

In the present specification, the term "cationic exchange properties" refers to both cationic exchange speed and cationic exchange capacity which are described in detail below. The term "aqueous liquid" refers to a liquid containing a given ingredient in water as a medium, and the liquid can take any form such as an aqueous solution, a suspension, a dispersion, or the like. The term "line-mixing" refers to a process in which a plural ingredients (raw materials and the like) are substantially homogeneously mixed in a line such as a feed line described below. The first embodiment and the second embodiment will be sequentially explained hereinbelow.

First, the first embodiment will be explained. Usable silica source and aluminum source are not particularly limited. It is preferable to use the silica source and the aluminum source in the form of an aqueous liquid, from the viewpoints of homogeneity of the reaction and dispersibility. The silica source includes, for instance, commercially available water glass. A silica source with adjusted molar ratios and concentrations can be prepared by adding water or an alkali hydroxide to the water glass as desired.

In addition, the aluminum source is not particularly limited. The aluminum source includes aluminum hydroxide, aluminum sulfate, aluminum chloride, alkali metal aluminates such as potassium aluminate and sodium aluminate, and the like. Among them, sodium aluminate is especially preferably used, from the viewpoint of high reactivity. These compounds can be used as the aluminum source by adjusting to appropriate molar ratio and concentration by using an alkali hydroxide and water as occasion demands. For instance, an aluminum source can be prepared by mixing aluminum hydroxide and sodium hydroxide in water, thereafter heating and dissolving the mixture, to give a sodium aluminate solution, and adding the resulting solution to water with stirring to make an aqueous liquid. In addition, the adjustment of the molar ratio and the concentration as described above can be also carried out by previously supplying water to a reaction tank, and adding thereto an aqueous alkali metal aluminate at a high concentration and an alkali hydroxide.

In the alkaline earth metal-containing compound which is coexistent in the reaction system, the alkaline earth metal includes Mg, Ca, Sr, Ba, and the like, among which Mg and Ca can be suitably used, from the viewpoints of convenience in the availability of the raw materials and costs. These compounds may be used alone or in admixture of two or more kinds. These compounds are added to the reaction system as hydroxides of the alkaline earth metals or alkaline earth metal salts of carbonates, sulfates, chlorides, nitrates, and the like. In addition, it is preferable that the alkaline earth metal-containing compound is added in the form of an aqueous liquid, from the viewpoint of homogeneity of the reaction and the like. It is particularly preferable to use the compound in the form of a water-soluble salt, and especially, aqueous chlorides of Ca, Mg and the like are favorably used. The hydroxide of an alkaline earth metal or the alkaline earth metal salt should be at least coexistent during the reaction of the silica source with the aluminum source. It is especially preferable to previously add the alkaline earth metal-containing compound in an aqueous liquid state to the silica source and/or the aluminum source. It is even more preferable to previously add the alkaline earth metal-containing compound to the silica source, from the viewpoint of making the average primary particle size very fine. In this case, it is preferable to previously add an entire alkaline earth metal-containing compound, but it may be acceptable to only add a part thereof. Also, thereafter, it is preferable that these silica source and aluminum source are mixed to carry out synthesis reaction of zeolite.

In the first embodiment of the present invention, contrary to the process of substituting Na ions with alkaline earth metal ions after the synthesis of zeolite, the alkaline earth metal is incorporated into the zeolite structure during the synthesis, so that the alkaline earth metal acts on a network of the zeolite, thereby forming zeolite having a very fine average primary particle size. From these viewpoints, it is preferable that the alkaline earth metal is previously made to be coexistent with the silica source having a high affinity therewith. In addition, it is desired that the alkaline earth metal partakes in the reaction at the initial stage of the reaction and/or during the crystallization. In the case of addition of the alkaline earth metal after the crystallization is once terminated, there cannot be obtained fine zeolite particles as excellent as those obtained in the first embodiment of the present invention.

The alkali metal-containing compound such as an alkali hydroxide mentioned above can be used as desired for the adjustment of the molar ratio or the concentration of the silica source and/or the aluminum source. Besides the above, the compound may be separately used. When separately used, such a compound can be used in the same manner as the alkali metal-containing compound. Preferable alkali metals are Na and/or K.

In this embodiment, the phrase "previously add" refers to a process, for instance, where an alkaline earth metal-containing compound is previously substantially homogeneously mixed with a silica source and/or an aluminum source before the reaction of the silica source with the aluminum source.

When the alkali metal and/or the alkaline earth metal is contained in the silica source and/or the aluminum source, the alkali metal-containing compound and/or the alkaline earth metal-containing compound, which is preferably in the form of an aqueous liquid, is added to the silica source and/or the aluminum source or vice versa.

The feeding composition in the first embodiment of the present invention is such that an $SiO_2/Al_2O_3$ molar ratio is preferably 0.5 or more, more preferably 1.5 or more, from the viewpoint of stability of the crystal structure, and that the $SiO_2/Al_2O_3$ molar ratio is preferably 6 or less, more preferably 4 or less, especially preferably 2.5 or less, from the viewpoint of cationic exchange properties.

In addition, as to the feeding composition of the alkaline earth metal-containing compound, the alkaline earth metal (Me) is expressed in the form of an oxide, and the feeding composition is such that an $MeO/Al_2O_3$ molar ratio is preferably 0.005 to 0.1, wherein the $MeO/Al_2O_3$ molar ratio is preferably 0.005 or more, more preferably 0.01 or more, from the viewpoint of an effect of making the average primary particle size very fine, and wherein the $MeO/Al_2O_3$ molar ratio is preferably 0.1 or less, more preferably 0.08 or less, still more preferably 0.05 or less, especially preferably 0.03 or less, from the viewpoint of cationic exchange properties.

As to the feeding composition of the alkali metal-containing compound, the alkali metal (M) is expressed in the form of an oxide, and the feeding composition is such that an $M_2O/Al_2O_3$ molar ratio is preferably 0.2 to 8, wherein the $M_2O/Al_2O_3$ molar ratio is preferably 0.2 or more, more preferably 1.5 or more, from the viewpoint of rate of crystallization, and wherein the $M_2O/Al_2O_3$ molar ratio is preferably 8 or less, more preferably 4 or less, from the viewpoint of yield. In addition, as the feeding composition of the alkali metal-containing compound and water in the reaction system, an $M_2O/H_2O$ molar ratio is preferably 0.03 or more, more preferably 0.04 or more, from the viewpoints of improving rate of crystallization and making the average primary particle size very fine. In addition, the $M_2O/H_2O$ molar ratio is preferably 0.07 or less, more preferably 0.06 or less, from the viewpoint of cationic exchange properties.

The concentration of the solid content during the reaction is preferably 10% by weight or more, more preferably 15% by weight or more, from the viewpoint of productivity. Also, the concentration of the solid content is preferably 50% by weight or less, 40% by weight or less, from the viewpoint of flowability of the slurry. Here, the concentration of the solid content during the reaction is defined as the concentration of the solid content based on the entire amount of a water-containing slurry, wherein the concentration of solid content is calculated by assuming that the weight of elements of Si, M, Al, and Me in the raw materials is calculated as oxides thereof, the raw materials being added to have the molar ratios given above.

The reaction is preferably carried out according to the process comprising placing a silica source, an aluminum source, and an aqueous liquid of an alkaline earth metal-containing compound in separate containers, respectively (an alkali metal being contained in the silica source and/or the aluminum source); adding the aqueous liquid of an alkaline earth metal-containing compound to the silica source and/or the aluminum source; and thereafter mixing the silica source with the aluminum source. Among them, a process comprising adding an aqueous liquid of an alkaline earth metal-containing compound to a silica source; thereafter adding the resulting mixture to an aluminum source or adding an aluminum source to the resulting mixture to carry out the reaction is especially preferable. In addition, when such silica source and aluminum source are mixed, the period of time required for their addition is preferably 1 to 50 minutes, more preferably 1 to 20 minutes, from the viewpoint of making the average aggregate particle size very fine.

The reaction temperature is preferably 25° to 100° C., more preferably 40° to 60° C., especially preferably 50° to 55° C. The reaction temperature is preferably 25° C. or more, more preferably 40° C. or more, especially preferably 50° C. or more, from the viewpoint of reaction rate. In addition, the reaction temperature is preferably 100° C. or less, more preferably 60° C. or less, especially preferably 55° C. or less, from the viewpoints of energy loads and withstanding pressure of a reaction tank.

In addition, the formed slurry becomes viscous by the abrupt gel-formation reaction at the initial stage of the reaction. Therefore, it is preferable that the slurry is vigorously stirred in order to accelerate the reaction of the slurry.

The reaction time is not particularly limited. The reaction time is preferably 1 to 180 minutes from the termination of the addition of the entire feeding components, more preferably 2 to 60 minutes therefrom, still more preferably 4 to 20 minutes therefrom, from the viewpoints of productivity and stability of the reaction.

The crystallization is progressed by aging the mixture after the reaction with stirring. The aging temperature is not particularly limited. The aging temperature is preferably 50° C. or more, more preferably 60° C. or more, especially preferably 80° C. or more, from the viewpoint of rate of the crystallization. In addition, the aging temperature is preferably 100° C. or less, from the viewpoints of energy loads and withstanding pressure of the reaction tank. The aging time is not particularly limited. It is preferable that the aging time is usually 1 to 300 minutes, from the viewpoint of productivity. During aging, it is preferable that aging is carried out until the highest peak intensity of the X-ray diffraction patterns reaches the maximum, or until the cationic exchange capacity reaches the maximum.

After the termination of aging, the crystallization is terminated by filtering and washing the slurry, or neutralizing the slurry with an acid. When filtering and washing the slurry, it can preferably be carried out until pH of the filtrate attains to preferably 12 or less. In addition, when neutralizing the slurry with an acid, the acid used is not particularly limited. The acid includes sulfuric acid, hydrochloric acid, nitric acid, carbon dioxide, oxalic acid, citric acid, tartaric acid, fumaric acid, succinic acid, and the like. Among them, sulfuric acid and carbonic acid gas are preferable, from the viewpoints of corrosion resistance of apparatus and costs. It is preferable that pH of the slurry is adjusted to 7 to 12. After the termination of the crystallization, the slurry may be dried as desired, to give the fine zeolite particles of the present invention.

Next, the second embodiment for a process for preparing fine zeolite particles of the present invention will be explained. Usable silica source and aluminum source are the same as those in the first embodiment described above. In addition, it is also preferable in this embodiment that the synthesis reaction of zeolite is carried out in the presence of the alkaline earth metal-containing compound. In this case, it is preferable to previously add the alkaline earth metal-containing compound, preferably in an aqueous liquid state, to the silica source and/or the aluminum source, and it is more preferable to previously add the alkaline earth metal-containing compound to the silica source. It is preferable to previously add an entire alkaline earth metal-containing compound to the silica source and/or the aluminum source, but it may be acceptable to only add a part of the alkaline earth metal-containing compound thereto. Exemplifications of the alkaline earth metal-containing compounds and the alkaline earth metals contained thereof, and embodiments using such compounds are the same as those in the first embodiment described above.

In this embodiment, the phrase "previously add" refers to an embodiment of a process where an alkaline earth metal-containing compound is previously substantially homogeneously mixed with a silica source and/or an aluminum source before feeding the silica source and the aluminum source. An example thereof includes, for instance, an embodiment of a process where an alkaline earth metal-containing compound is directly added to a silica source and/or an aluminum source and mixed therewith, and thereafter the silica source is mixed with the aluminum source to carry out the reaction. The phrase also refers to another embodiment of a process where it is not necessary that an alkaline earth metal-containing compound is directly added to and mixed with a silica source and/or an aluminum source, but the alkaline earth metal-containing compound is mixed part of the way of feeding the silica source and/or the aluminum source. An example thereof includes, for instance, an embodiment of a process comprising carrying out line-mixing wherein a feed line for a silica source and/or an aluminum source is linked with a feed line for an alkaline earth metal-containing compound at a position immediately before a circulating line for line-mixing. Alternatively, a process may comprise directly supplying an alkaline earth metal-containing compound to a reaction tank. It is desired that an alkaline earth metal-containing compound partakes in the reaction at the initial stage of the reaction and/or during crystallization.

The feeding composition of each component in the second embodiment of the present invention is essentially the same as that in the first embodiment described above.

However, in this embodiment, it is not necessary that the alkaline earth metal-containing compound is present during the reaction of the silica source with the aluminum source. Therefore, in this embodiment, as the feeding composition of the alkaline earth metal-containing compound, the alkaline earth metal (Me) is expressed in the form of an oxide, and the feeding composition is such that an $MeO/Al_2O_3$ molar ratio is preferably 0 to 0.1, wherein the $MeO/Al_2O_3$ molar ratio is more preferably 0.005 or more, especially preferably 0.01 or more, from the viewpoint of an effect of making the average primary particle size very fine, and wherein the $MeO/Al_2O_3$ molar ratio is more preferably 0.08 or less, still more preferably 0.05 or less, especially preferably 0.03 or less, from the viewpoint of cationic exchange properties.

Embodiments where an alkali metal and/or an alkaline earth metal is contained in a silica source and/or an aluminum source are the same as those in the first embodiment described above. In addition, the concentration of solid content during reaction is the same as that of the first embodiment described above.

In the second embodiment of the process for preparing fine zeolite particles of the present invention, the reaction is carried out by mixing raw materials mainly comprising a silica source and an aluminum source in an external circulating line connected to a reaction tank. In this case, the reaction can be also carried out as described above with other raw material, preferably the alkaline earth metal-containing compound as mentioned above, being further fed in the form of a substantially homogeneous mixture, prepared by mixing the other raw material with a silica source and/or an aluminum source, or simultaneously with a silica source and/or an aluminum source, or separately after a silica source and an aluminum source are mixed to start the reaction therebetween. In addition, the reaction can be also carried out as described above, with the alkali metal-containing compound as mentioned above being further fed in the same manner as that of the alkaline earth metal-containing compound as desired. It is preferable that a wet-type mixer (for instance, disintegrators, dispersers, and pulverizers, such as homomic line mills, pipeline homomixers, homogenizers, static mixers, gear pumps, turbine pumps, centrifugal pumps) is arranged part of the way of the circulating line, so that the slurry formed after feeding each raw materials to the circulating line can be passed through the circulating line.

The silica source and the aluminum source may be fed into the circulating line at the same position, or different positions, from each corresponding raw material tank; alternatively, one of the silica source or the aluminum source may be directly supplied to the reaction tank and circulated in the circulating line, and the other is fed into the circulating line from the corresponding raw material tank. Whichever the silica source or the aluminum source may be fed first, or both the silica source and the aluminum source may be fed simultaneously. Each raw material tank is connected to a certain position in the circulating line via a feed line, preferably to a certain position in the circulating line connecting between an outlet of a reaction tank and an inlet of a mixer, and each raw material fed from each raw material tank is fed into the circulating line via the feed line. Alternatively, when one of the raw materials is directly supplied to the reaction tank, this raw material is mixed in the circulating line with the other raw material fed into the circulating line, the raw material from the reaction tank being circulated in the circulating line. It is preferable that the synthesis of the fine zeolite particles according to the present invention can be efficiently carried out by feeding the raw materials a certain position in the circulating line connecting between the outlet of the reaction tank and the inlet of the mixer, and mixing the raw materials. Here, it is preferable that an agitator equipped with agitation impellers is each arranged inside the reaction tank and inside each raw material tank, in order that the slurry becomes more homogeneous in the reaction tank and that the feeding of the raw material in the raw material tank is smoothly carried out.

In the second embodiment of the process for preparing fine zeolite particles of the present invention, there are concretely the following processes:

First Preparation Process

This process comprises supplying water to a reaction tank; and feeding an aluminum source and a silica source from each raw material tank into a circulating line via each feed line, with water being circulated in the circulating line.

It is preferable that an alkali metal-containing compound is previously added to a silica source and/or an aluminum source; that an alkali metal-containing compound is simultaneously fed into a circulating line together with a silica source and/or an aluminum source from each raw material tank; or that an alkali metal-containing compound is directly supplied to a reaction tank. It is preferable that a part or an entire part of an alkaline earth metal-containing compound is previously added to a silica source. An alkaline earth metal-containing compound may be previously added to an aluminum source. Alternatively, an alkaline earth metal-containing compound may be simultaneously fed together with a silica source and/or an aluminum source from each raw material tank into a circulating line; or an alkaline earth metal-containing compound may be fed into a circulating line after previously added to a silica source and/or an aluminum source by means of line-mixing wherein a feed line for the silica source and/or the aluminum source is linked with a feed line for the alkaline earth metal-containing compound at a position immediately before the circulating line for line-mixing. In addition, an alkaline earth metal-containing compound may be directly supplied to a reaction tank.

Second Preparation Process

This process comprises supplying an aluminum source to a reaction tank; and simultaneously feeding a silica source and water into a circulating line via each feed line from each raw material tank, with the aluminum source being circulated in the circulating line.

It is preferable that an alkali metal-containing compound is previously added to a silica source and/or water; that an alkali metal-containing compound is simultaneously fed into a circulating line together with a silica source and/or water from each raw material tank; or that an alkali metal-containing compound is directly supplied to a reaction tank and previously added to an aluminum source, or an alkali metal-containing compound is simultaneously supplied to a reaction tank together with an aluminum source. It is preferable that a part or an entire part of an alkaline earth metal-containing compound is previously added to a silica source. Alternatively, an alkaline earth metal-containing compound may be simultaneously fed together with a silica source from each raw material tank into a circulating line; or an alkaline earth metal-containing compound may be fed into a circulating line after the alkaline earth metal-containing compound is previously added to a silica source by means of line-mixing wherein a feed line for the silica source is linked with a feed line for the alkaline earth metal-containing compound at a position immediately before the circulating line for line-mixing. In addition, an alkaline earth metal-containing compound may be directly supplied to a reaction tank and previously added to an aluminum source, or an alkaline earth metal-containing compound may be simultaneously supplied to a reaction tank together with an aluminum source. Further, an alkaline earth metal-containing compound may be fed together with water.

Third Preparation Process

This process comprises supplying a silica source to a reaction tank; and simultaneously feeding an aluminum source and water into a circulating line via each feed line from each raw material tank, with the silica source being circulated in the circulating line.

It is preferable that an alkali metal-containing compound is previously added to an aluminum source and/or water; that an alkali metal-containing compound is simultaneously fed into a circulating line together with an aluminum source and/or water from each raw material tank; or that an alkali metal-containing compound is directly supplied to a reaction tank and previously added to a silica source, or an alkali metal-containing compound is simultaneously supplied to a reaction tank together with a silica source. It is preferable that a part or an entire part of an alkaline earth metal-containing compound is previously added to a silica source. The alkaline earth metal-containing compound may be directly supplied to a reaction tank and previously added to a silica source, or an alkaline earth metal-containing compound may be simultaneously supplied to a reaction tank together with a silica source. Alternatively, an alkaline earth metal-containing compound may be fed after previously added to or simultaneously fed with an aluminum source from each corresponding raw material tank into a circulating line; or an alkaline earth metal-containing compound may be fed into a circulating line after previously added to an aluminum source by means of line-mixing wherein a feed line for the aluminum source is linked with a feed line for the alkaline earth metal-containing compound at a position immediately before the circulating line for line-mixing. Further, an alkaline earth metal-containing compound may be fed together with water.

The first to third preparation processes described above are preferred embodiments especially when the main reaction is carried out in the reaction tank.

The mixing ratio of the silica source to the aluminum source in the circulating line can be adjusted depending upon the circulation flow rate and the feed flow rate of each raw material. The mixing ratio, as expressed by an $SiO_2/Al_2O_3$ molar ratio, is preferably 0.1 or more, more preferably 0.5 or more, especially preferably 1 or more, from the viewpoint of oil-absorbing ability. Also, the mixing ratio is preferably 3 or less, more preferably 2.5 or less, especially preferably 2 or less, from the viewpoint of flowability of the slurry.

When the reaction is carried out by supplying a silica source or an aluminum source to a reaction tank and feeding other raw materials into a circulating line with the silica source or aluminum source being circulated in the circulating line as in the second and third preparation processes, there may be some cases where the mixing ratio changes with the passage of time owing to the increase in the ratio of products during the reaction. In such a case, by adjusting the raw material concentrations and the circulation flow rate and the like so that the mixing ratio of the raw materials at the time when the other materials are started to be fed, as expressed by an $SiO_2/Al_2O_3$ molar ratio, is preferably 0.1 to 3, more preferably 0.5 to 2.5, especially preferably 1 to 2, the desired fine zeolite particles can be obtained in accordance with the process of the present invention. Here, the mixing ratio (molar ratio) is calculated by the following equation:

$$\text{Mixing Ratio} = \frac{(Qs \times Cs)}{(Qa \times Ca)}$$

wherein Qa stands for a flow rate (kg/min) of an aluminum source; Ca stands for a molar concentration (mol/kg) of $Al_2O_3$ contained in the aluminum source; Qs stands for a flow rate (kg/min) of a silica source; and Cs stands for a molar concentration (mol/kg) of $SiO_2$ contained in the silica source.

Here, the reaction temperature, the vigorous agitation at the initial stage of the reaction, the reaction time and the process for crystallizing zeolite are essentially the same as those in the first embodiment described above. However, in this embodiment, the crystallization of zeolite is concretely proceeded by aging with or without the slurry circulation in the circulating line after the termination of the reaction. After the termination of aging, the crystallization is terminated by filtering and washing the slurry, or neutralizing the slurry with an acid in the same manner as that in the first embodiment, to give the fine zeolite particles of the present invention.

An especially preferable embodiment for the process for preparing fine zeolite particles of the present invention is an embodiment in which the first embodiment is combined with the second embodiment described above. In other words, such a preferable embodiment comprises feeding an aluminum source and a silica source into a circulating line connected to a reaction tank, and reacting the aluminum source with the silica source in the presence of the alkaline earth metal-containing compound. The alkaline earth metal-containing compound, as described above, can be made present in the reaction system by, for instance, previously adding the alkaline earth metal-containing compound to the aluminum source and/or the silica source, more preferably previously adding the alkaline earth metal-containing compound to the silica source. The alkaline earth metal, as mentioned above, is preferably Ca and/or Mg. As to the feeding composition of the alkaline earth metal-containing compound, the alkaline earth metal (Me) is expressed in the form of an oxide, and the feeding composition is such that an $MeO/Al_2O_3$ molar ratio is preferably 0.005 to 0.1, wherein the $MeO/Al_2O_3$ molar ratio is preferably 0.005 or more, more preferably 0.01 or more, from the viewpoint of an effect of making the average primary particle size very fine, and wherein the $MeO/Al_2O_3$ molar ratio is preferably 0.1 or less, more preferably 0.08 or less, still more preferably 0.05 or less, especially preferably 0.03 or less, from the viewpoint of cationic exchange properties. In addition, the alkali metal-containing compound can be used in the same manner as above. The feeding composition thereof may be the same as that described above. The phrase "previously add" in this embodiment may be the same as that in the second embodiment for the process for preparing fine zeolite particles of the present invention.

By reacting the aluminum source with the silica source according to this embodiment, the desired fine zeolite particles of the present invention can be efficiently obtained even in a reaction where the concentration of the solid content is especially high during the reaction. In addition, this embodiment is especially preferable from the viewpoints of improvements in the cationic exchange properties and the oil-absorbing ability. This embodiment is especially effective when the concentration of the solid content is 25% by weight or more during the reaction, and even when the concentration is as high as 30% by weight or more, the desired fine zeolite particles of the present invention can be efficiently obtained.

It is preferable that the fine zeolite particles of the present invention, obtainable by the process for preparing fine zeolite particles of the present invention as explained above, have the following general formula in anhydride form:

$$xM_2O \cdot ySiO_2 \cdot Al_2O_3 \cdot zMeO,$$

wherein M is an alkali metal; Me is an alkaline earth metal; x is a number of 0.2 to 2; y is a number of 0.5 to 6; and z is a number of 0.005 to 0.1. In the above composition, M is more preferably Na and/or K, and especially preferably Na, from the viewpoints of convenience in the availability of the raw materials and costs. Me is preferably Ca and/or Mg. In addition, x is more preferably a number of 0.6 to 1.3, and y is more preferably a number of 0.9 to 5 z is preferably 0.005 or more, from the viewpoint of making the average primar particle size very fine. z is preferably 0.1 or less, more preferably 0.08 or less, especially preferably 0.01 to 0.03, from the viewpoints of cationic exchange properties, i.e. cationic exchange speed and cationic exchange capacity. In the second embodiment, it is not necessary that the alkaline earth metal is present during the reaction of the silica source with the alumina source. Therefore, the values of z in the above general formula may be preferably 0 to 0.1, and those values of z specified in above range are more preferable.

In addition, the fine zeolite particles of the present invention obtainable 1 the process of the present invention have a known crystal form, as exemplified by A-type, X-type, Y-type, P-type zeolites and the like. The crystal forms are not particularly limited. X-type and A-type zeolites are preferable, from the viewpoint of cationic exchange properties, and A-type zeolite is more preferable These formed crystalline phases may a single phase or a mixed phase.

The average primary particle size of the fine zeolite particles of the present invention is determined as an average value of directional diameter formed by tangents (Feret diameter) obtained by scanning electron microscope (SEM). The average primary particle size is preferably 1.5 μm or less, more preferably 1.3 μm or less, from the viewpoint of cationic exchange speed. In addition, the average primary particle size is preferably 0.2 μm or more, more preferably 0.5 μm or more, because when the average primary particle size is exceeding small the crystallinity is lowered and the average aggregate particle size becomes large.

The term "cationic exchange speed" of the fine zeolite particles of the present invention refers to an exchange capacity of Ca ions per one minute owned by the fine zeolite particles. The cationic exchange speed is preferably 150 mg $CaCO_3$/g or more, more preferably 170 mg $CaCO_3$/g or more, from the viewpoint of deterging performance. On the other hand, the term "cationic exchange capacity" refers to an exchange capacity of Ca ions per 10 minutes owned by the fine zeolite particles of the present invention. The cationic exchange capacity is preferably 150 mg $CaCO_3$/g or more, more preferably 180 mg $CaCO_3$/g or more, especially preferably 200 mg $CaCO_3$/g or more, from the viewpoint of deterging performance.

The average aggregate particle size of the fine zeolite particles of the present invention is determined by laser diffraction-scattering-type particle size distribution analyzer or the like. The average aggregate particle size is preferably 13 μm or less, more preferably 7 μm or less, especially preferably 1 to 5 μm, from the viewpoints of dispersibility of the fine zeolite particles and deposition property to clothes when formulated in a detergent.

Further in the present invention, a dispersion parameter is defined as a product of the average primary particle size (μm) multiplied by the average aggregate particle size (μm). Those having a dispersion parameter of preferably 7 or less, more preferably 0.1 to 5, generally have a cationic exchange speed of 150 mg $CaCO_3$/g or more, so that they are suitable as the fine zeolite particles of the present invention.

In addition, when the average primary particle size is denoted by X μm, and the average aggregate particle size is denoted by Y μm, those in which X and Y satisfy the relationship of $0.6 \leq X \leq 1.5$, preferably $0.7 \leq X \leq 1.2$, more preferably $0.8 \leq X \leq 1.0$, and also satisfy the relationship of $20X/3 - 2.4 \leq Y \leq 15$, wherein Y preferably satisfies a number of 12 or less, more preferably a number of 10 or less, and further satisfy the relationship of $X \leq Y$ are preferable owing to their generally excellent oil-absorbing ability. When X and Y satisfy the above relationships in the resulting fine zeolite particles, there are tendencies that the average primary particle size is very fine and that its average aggregate particle size appropriately develops, and consequently there are simultaneously caused "formation of gaps between particles" and "exposure of the surface of the primary particles," whereby the improvement in the oil-absorbing ability is assumed to be exhibited.

The oil-absorbing ability is expressed by an amount of linseed oil absorbed as described in detail in Examples. The oil-absorbing ability is preferably 50 mL/100 g or more, more preferably 70 mL/100 g or more, especially preferably 80 to 130 mL/100 g. With the above-specified range for the oil-absorbing ability, the fine zeolite particles are preferable, from the viewpoint of re-dispersibility.

The fine zeolite particles of the present invention have a very fine average primary particle size, excellent cationic exchange properties and oil-absorbing ability, a very fine average aggregate particle size and also excellent dispersibility. Therefore, the fine zeolite particles can be suitably used for fillers for paper manufacturing, resin fillers, water treatment agents, detergent builders, oxygen-nitrogen separating agents, soil improving agents for gardening, polishing agents, and the like, and the fine zeolite particles are especially suitably used for detergent builders.

Next, the detergent composition in which the fine zeolite particles of the present invention are used as detergent builders will be explained. The content of the fine zeolite particles in the detergent composition is not particularly limited. The content is preferably 1% by weight or more, more preferably 3% by weight or more, especially preferably 10% by weight or more, from the viewpoint of exhibiting sufficient deterging performance. In addition, the content is preferably 80% by weight or less, more preferably 70% by weight or less, especially preferably 60% by weight or less, from the viewpoint of preventing turbidity of the washing liquid and the deposition to clothes.

The above detergent composition can further comprise a surfactant. The surfactant is not particular limited. The surfactant includes, for instance, nonionic surfactants, anionic surfactants, cationic surfactants, amphoteric surfactants, and the like.

Concrete examples of the nonionic surfactants include, for instance, known nonionic surfactants described in Tokkyocho Koho: "Shuchi Kanyo Gijutsu (clothes powder detergent), Chapter 3-1," published by the Japanese Patent Office.

Particularly, polyoxyethylene oxide and/or polypropylene oxide type nonionic surfactants are preferable, and a polyoxyethylene alkyl ether prepared by adding ethylene oxide in an amount of 5 to 15 moles in average to a primary or secondary alcohol having 8 to 16 carbon atoms is especially preferable.

Other nonionic surfactants include polyoxyethylene alkylphenyl ethers, polyoxyethylene alkylamines, sucrose fatty acid esters, fatty acid glycerol monoesters, higher fatty acid alkanolamides, polyoxyethylene higher fatty acid alkanolamides, amine oxides, alkyl glycosides, alkylglyceryl ethers, N-alkyl gluconamides, and the like.

The anionic surfactants include, for instance, known anionic surfactants described, for instance, in Tokkyocho Koho: "Shuchi Kanyo Gijutsu (clothes powder detergent), Chapter 3-1," published by the Japanese Patent Office.

Concretely, one or more kinds of anionic surfactants selected from the group consisting of alkylbenzenesulfonates, alkyl sulfates and alkenyl sulfates, polyoxyethylene alkyl ether sulfates (average moles of ethylene oxide: 0.5 to 6), alkyl monophosphates and salts of fatty acids, each having a linear or branched, alkyl or alkenyl group having 8 to 22 average carbon atoms, are preferable, among which alkylbenzenesulfonates and alkyl sulfonates are especially preferable.

The counter ions of these anionic surfactants are selected from the group consisting of sodium ions, potassium ions, magnesium ions, calcium ions, cations formed by protonation of amines such as ethanolamines, quaternary ammonium salts, and mixtures thereof. When the above anionic surfactant is used, there may be employed, for instance, a process comprising formulating an anionic surfactant in an acid form, and separately adding an alkali thereto.

The cationic surfactants include, for instance, known cationic surfactants described, for instance, in Tokkyocho Koho: "Shuchi Kanyo Gijutsu (clothes powder detergent), Chapter 3-1," published by the Japanese Patent Office. Preferable cationic surfactants include, for instance, quaternary ammonium salts such as benzalkonium type quaternary ammonium salts.

The amphoteric surfactants include, for instance, those known amphoteric surfactants described, for instance, in Tokkyocho Koho: "Shuchi Kanyo Gijutsu (clothes powder detergent), Chapter 3-1," published by the Japanese Patent Office. Preferable amphoteric surfactants include, for instance, alkylbetaine-type amphoteric surfactants and the like.

The above surfactants may be used alone or in admixture of two or more kinds. In addition, the surfactants may be selected from the same kind of a surfactant as in the case where a plural surfactants are selected from anionic surfactants, or the surfactants may be selected from various different kinds of surfactants as in the case where a plural surfactants are selected from anionic surfactants and nonionic surfactants.

The content of the surfactant in the detergent composition of the present invention is not particularly limited. The content of the surfactant is preferably 1% by weight or more, more preferably 5% by weight or more, especially preferably 10% by weight or more, from the viewpoint of detergency. In addition, the content of the surfactant is preferably 80% by weight or less, more preferably 60% by weight or less, especially preferably 50% by weight or less, from the viewpoint of rinsability.

In addition, various additives usually formulated in laundry detergents can be appropriately formulated in the detergent composition comprising the fine zeolite particles of the present invention. The contents thereof can be appropriately adjusted within a range so as not to impair the desired effects of the detergent composition of the present invention.

The above additives may be those generally used for detergents without limitation. The additives include, for instance, inorganic chelating agents such as commercially available zeolites (those having an average primary particle size exceeding 1.5 μm), amorphous aluminosilicates, crystalline silicates, amorphous silicates, sodium tripolyphosphates, and sodium metasilicate; organic chelating agents such as aminopolyacetates and polyacrylates; anti-deposition agents such as carboxymethyl cellulose; water-soluble organic solvents such as polyethylene glycols and glycerol; alkalizing agents such as sodium carbonate and potassium carbonate; enzymes such as protease, lipase, cellulase, and amylase; bleaching agents such as sodium percarbonate and sodium perborate; bleaching activators; sodium salts such as sodium sulfate and sodium chloride; antioxidants; clay minerals; fluorescent dyes; blueing agents; perfumes, and the like.

The detergent composition of the present invention can be obtained according to a known process by mixing each of the above components with stirring, and granulating or the like as desired. Since the resulting detergent composition comprises the fine zeolite particles of the present invention, the composition has very excellent detergency. The detergency can be evaluated in accordance with Test Example described below.

Determination values in Examples and Comparative examples were measured by the following methods. Here, "%" means "% by weight." In each Table, the units for the cationic exchange speed and the cationic exchange capacity are each simply expressed as "mg/g." In addition, sodium aluminate was used as an aqueous solution of sodium aluminate in Examples and Comparative Examples, unless otherwise specified.

(1) Cationic Exchange Speed

The amount 0.04 g, when calculated as anhydride, of a sample was accurately weighed, and added to 100 mL of an aqueous calcium chloride (100 ppm calcium concentration, when calculated as $CaCO_3$) in a 100 mL beaker, followed by stirring at 20° C. for 1 minute. Thereafter, the mixture was filtered using a membrane filter with 0.2 μm pore size. The amount 10 mL of the filtrate was taken and assayed for Ca content in the filtrate by an EDTA titration, and the amount of Ca (when calculated as $CaCO_3$) ion-exchanged by 1 g of the sample for 1 minute was determined as the cationic exchange speed (mg $CaCO_3$/g).

(2) Cationic Exchange Capacity

The amount 0.04 g, when calculated as anhydride, of a sample was accurately weighed, and added to 100 mL of an aqueous calcium chloride (100 ppm calcium concentration, when calculated as $CaCO_3$) in a 100 mL beaker, followed by stirring at 20° C. for 10 minute. Thereafter, the mixture was filtered using a membrane filter with 0.2 μm pore size. The amount 10 mL of the filtrate was taken and assayed for Ca content in the filtrate by an EDTA titration, and the amount of Ca (when calculated as $CaCO_3$) ion-exchanged by 1 g of the sample for 10 minutes was determined as the cationic exchange capacity (mg $CaCO_3$/g).

(3) Average Primary Particle Size

The average primary particle size (μm; average value for 50 or more particles) was measured by a digitizer (commercially available from Graphtic, "DIGITIZER KW3300"), with the scanning electron photomicrographs taken by a field-emission high resolution scanning electron microscope (FE-SEM, commercially available from Hitachi Ltd., S400).

(4) Average Aggregate Particle Size

The particle distribution was measured after dispersing a sample in ion-exchanged water as a dispersion medium by ultrasonication for 1 minute, using a laser diffraction/scattering particle size distribution analyzer (commercially available from HORIBA Ltd., LA-700). The median diameter obtained was considered as an average aggregate particle size (μm).

(5) Oil-Absorbing Ability

The oil-absorbing ability (mL/100 g) was obtained as an amount of absorbed linseed oil by a method according to JIS K 5101.

(6) Crystal Form

X-ray diffraction patterns were measured using an X-ray diffractometer (commercially available from K.K. Rigaku, Model: RAD-200) under the conditions of CuK α-ray, 40 kV, and 120 mA. The obtained X-ray diffraction patterns were qualitatively evaluated based on the X-ray crystal diffraction patterns presented in JCPDS (Joint Committee on Powder Diffraction Standards).

EXAMPLE 1

To a 2-liter stainless separable flask (inner diameter: 12 cm) was added 1297.2 g of 48% NaOH, and 1000 g of aluminum hydroxide (purity: 99%) was then added thereto with agitation. Thereafter, the temperature was raised, and the mixture was heated at 120° C. for 1 hour. Thereafter, the mixture was cooled, to give sodium aluminate ($Na_2O$: 21.01%, $Al_2O_3$: 28.18%).

Three-hundred and twenty grams of sodium aluminate obtained by the above procedures was placed in another 2-liter stainless separable flask, and thereafter 316.1 g of 48% NaOH was added thereto. This mixture was used as an aluminum source.

Next, 355.6 g of No. 3 water glass ($Na_2O$: 9.68%, $SiO_2$: 29.83%) was placed in a still another 2-liter stainless separable flask, and an aqueous calcium chloride, which was previously prepared by mixing 818.2 g of ion-exchanged water with 1.96 g of anhydrous calcium chloride, was added thereto with agitation. The resulting water glass solution was used as a silica source containing an alkaline earth metal. Here, No. 3 water glass used was one commercially available from Osaka Keiso.

The above aluminum source was heated to 50° C., with agitating at 300 rpm with agitation impellers having an impeller diameter of 11 cm. In addition, the silica source was similarly heated to 50° C. When both raw materials reached 50° C., the silica source was added dropwise to the aluminum source over 5 minutes using a peristaltic pump. After the termination of the addition, the reaction was carried out with keeping the temperature at 50° to 60° C. for 10 minutes. Next, the reaction mixture was heated to 80° C., and thereafter aged for 1.5 hours at 80° C. with agitation. The concentration of the solid content during the reaction was 23%. In addition, an $Na_2O/H_2O$ molar ratio was 0.05.

The resulting slurry was filtered and washed with water until the pH of the filtrate attained to 11.4. The resulting residue was then dried at 100° C. for 13 hours, to give a zeolite powder.

The composition of the resulting zeolite, in an anhydride form, was 1.09 $Na_2O$. 2.05 $SiO_2$. $Al_2O_3$. 0.02 CaO (x=1.09, y=2.05 and z=0.02). In addition, the crystal form was found to be A-type zeolite belonging to ASTM No. 38-241 from the results of the X-ray diffraction patterns.

In addition, the resulting fine zeolite particles had an average primary particle size of 0.87 μm, a cationic exchange speed of 184 mg $CaCO_3$/g, and a cationic exchange capacity of 219 mg $CaCO_3$/g, and showed excellent cationic exchange properties. Further, the fine zeolite particles had an average aggregate particle size of 4.2 μm, and an oil-absorbing ability of 53 mL/100 g.

EXAMPLES 2 to 6

The synthesis and evaluation of zeolite were carried out in the same manner as in Example 1, an aluminum source and a water glass solution with a different amount of Ca added based on the feeding amount shown in Table 1 as a silica source, prepared in the same manner as in Example 1. As a result, fine A-type zeolite particles having an average primary particle size of from 0.75 to 1.3 μm as shown in Table 2 were obtained.

COMPARATIVE EXAMPLE 1

The synthesis and evaluation of zeolite were carried out in the same manner as in Example 1, except that the synthesis was carried out based on the feeding composition in Table 1 without addition of an alkaline earth metal. As a result, in the case where an alkaline earth metal was not added, the average primary particle size was as large as 1.8 μm, and the cationic exchange speed was as low as 130 mg $CaCO_3$/g as shown in Table 2.

COMPARATIVE EXAMPLE 2

The amount 3.5 g of zeolite synthesized in Comparative Example 1 was added to 1 L of a 333 mg/L aqueous solution of anhydrous calcium chloride, and the resulting mixture was agitated for 10 minutes. Subsequently, the mixture was filtered using a membrane filter with 0.2 μm pore size, and thereafter the resulting residue was washed with 1 L of ion-exchanged water and dried at 100° C. for 13 hours. Although Ca in the resulting zeolite was ion-exchanged as shown in the composition of the product in Table 2, the change in the average primary particle size due to the ion exchange was not found.

TABLE 1

| | Feeding Amount (g) | | | | | Feeding Composition (Molar Ratio) | | | Concentration of Solid Content |
|---|---|---|---|---|---|---|---|---|---|
| | Sodium Aluminate | 48% NaOH | No. 3 Water Glass | Ion-Exchanged Water | Anhydrous Calcium Chloride | $SiO_2/Al_2O_3$ | $Na_2O/Al_2O_3$ | $CaO/Al_2O_3$ | (%) |
| Example 1 | 320 | 316.1 | 355.6 | 818.2 | 1.96 | 2 | 4 | 0.02 | 23 |
| Example 2 | 320 | 316.1 | 355.6 | 815.7 | 0.49 | 2 | 4 | 0.005 | 23 |
| Example 3 | 320 | 316.1 | 355.6 | 818.2 | 0.98 | 2 | 4 | 0.01 | 23 |
| Example 4 | 320 | 316.1 | 355.6 | 819.8 | 2.94 | 2 | 4 | 0.03 | 23 |
| Example 5 | 320 | 316.1 | 355.6 | 823.1 | 4.91 | 2 | 4 | 0.05 | 23 |
| Example 6 | 320 | 316.1 | 355.6 | 828.1 | 7.85 | 2 | 4 | 0.08 | 23 |
| Comparative Example 1 | 320 | 316.1 | 355.6 | 814.8 | 0 | 2 | 4 | 0 | 23 |

TABLE 2

| | Composition of Product (Anhydride) (Molar Ratio) | | | | Cationic Exchange Properties (mg/g) | | Average Primary Particle Size X (μm) | Average Aggregate Particle Size Y (μm) | Dispersion Parameter (X × Y) | 20X/3 − 2.4 | Oil-Absorbing Ability (mL/100 g) | Crystal Form |
|---|---|---|---|---|---|---|---|---|---|---|---|---|
| | $SiO_2$ | $Na_2O$ | $Al_2O_3$ | CaO | Cationic Exchange Speed | Cationic Exchange Capacity | | | | | | |
| Example 1 | 2.05 | 1.09 | 1.0 | 0.02 | 184 | 219 | 0.87 | 4.2 | 3.7 | 3.4 | 53 | A-type Zeolite |
| Example 2 | 2.08 | 1.09 | 1.0 | 0.005 | 152 | 215 | 1.3 | 4.8 | 6.2 | 6.3 | 58 | A-type Zeolite |
| Example 3 | 2.07 | 1.10 | 1.0 | 0.010 | 170 | 220 | 1.05 | 4.5 | 4.7 | 4.6 | 59 | A-type Zeolite |
| Example 4 | 2.05 | 1.05 | 1.0 | 0.030 | 165 | 210 | 0.75 | 3.4 | 2.6 | 2.6 | 58 | A-type Zeolite |
| Example 5 | 1.98 | 1.06 | 1.0 | 0.050 | 160 | 200 | 0.8 | 3.4 | 2.7 | 2.9 | 59 | A-type Zeolite |
| Example 6 | 2.01 | 1.02 | 1.0 | 0.080 | 155 | 185 | 0.85 | 3.3 | 2.8 | 3.3 | 58 | A-type Zeolite |
| Comparative Example 1 | 2.09 | 1.07 | 1.0 | 0 | 130 | 206 | 1.8 | 5.1 | 9.2 | 9.6 | 42 | A-type Zeolite |
| Comparative Example 2 | 2.09 | 1.01 | 1.0 | 0.027 | 114 | 197 | 1.8 | 5.1 | 9.2 | 9.6 | 42 | A-type Zeolite |

EXAMPLE 7

The synthesis and evaluation of zeolite were carried out by the same reaction and process as in Example 1, an aluminum source and a silica source prepared in the same amounts as in Example 1, and the time for adding the silica source changed to 20 minutes (Table 3). As a result, fine A-type zeolite particles excellent in the cationic exchange speed as shown in Table 4 were obtained, even though the average aggregate particle size was a slightly large.

EXAMPLE 8

The synthesis and evaluation of zeolite were carried out in the same manner as in Example 7, an alkaline earth metal salt added being anhydrous magnesium chloride (Table 3). As a result, similar fine A-type zeolite particles to those obtained in Example 7 as shown in Table 4 were obtained.

COMPARATIVE EXAMPLE 3

The synthesis and evaluation of zeolite were carried out in the same manner as in Example 7. However, an alkaline earth metal was not added during the synthesis (Table 3). As a result, the average aggregate particle size was as large as 28.3 μm, and the cationic exchange speed was as low as 97 mg $CaCO_3$/g, as shown in Table 4.

TABLE 3

| | Feeding Amount (g) | | | | | Feeding Composition (Molar Ratio) | | | | Concentration of Solid Content (%) |
|---|---|---|---|---|---|---|---|---|---|---|
| | Sodium Aluminate | 48% NaOH | No. 3 Water Glass | Ion-Exchanged Water | Anhydrous Calcium Chloride | Anhydrous Magnesium Chloride | $SiO_2/Al_2O_3$ | $Na_2O/Al_2O_3$ | $CaO/Al_2O_3$ | $MgO/Al_2O_3$ | |
| Example 7 | 320 | 316.1 | 355.6 | 818.2 | 1.96 | 0 | 2 | 4 | 0.02 | 0 | 23 |
| Example 8 | 320 | 316.1 | 355.6 | 817.2 | 0 | 1.68 | 2 | 4 | 0 | 0.02 | 23 |
| Comparative Example 3 | 320 | 316.1 | 355.6 | 814.8 | 0 | 0 | 2 | 4 | 0 | 0 | 23 |

TABLE 4

| | Composition of Product (Anhydride) (Molar Ratio) | | | | | Cationic Exchange Properties (mg/g) | | Average Primary Particle Size X (μm) | Average Aggregate Particle Size Y (μm) | Dispersion Parameter (X × Y) | 20X/3 − 2.4 | Oil-Absorbing Ability (mL/100 g) | Crystal Form |
|---|---|---|---|---|---|---|---|---|---|---|---|---|---|
| | $SiO_2$ | $Na_2O$ | $Al_2O_3$ | CaO | MgO | Cationic Exchange Speed | Cationic Exchange Capacity | | | | | | |
| Example 7 | 2.11 | 1.06 | 1.0 | 0.021 | 0 | 187 | 218 | 0.9 | 6.9 | 6.2 | 3.6 | 76 | A-type zeolite |
| Example 8 | 2.07 | 1.10 | 1.0 | 0 | 0.02 | 172 | 210 | 0.95 | 7.2 | 6.8 | 3.9 | 82 | A-type zeolite |
| Comparative Example 3 | 2.05 | 1.03 | 1.0 | 0 | 0 | 97 | 215 | 2.1 | 28.3 | 59.4 | 11.6 | 124 | A-type zeolite |

EXAMPLE 9

The synthesis and evaluation of zeolite were carried out in the same manner as in Example 1, except that the feeding composition of $Na_2O/Al_2O_3$ (molar ratio) was changed to 3 (Table 5). An $Na_2O/H_2O$ molar ratio during the reaction was 0.04. The resulting product was A-type zeolite having a cationic exchange speed as high as that of Example 1, even though the resulting zeolite had an average primary particle size of 1.3 μm which was a slightly larger than that of Example 1, as shown in Table 6.

COMPARATIVE EXAMPLE 4

The synthesis and evaluation of zeolite was carried out in the same manner as in Example 9. However, an alkaline earth metal was not added during the synthesis (Table 5). As a result, the resulting zeolite had an average primary particle size of as large as 2.2 μm, and a cationic exchange speed of as low as 90 mg $CaCO_3/g$, as shown in Table 6.

TABLE 5

| | Feeding Amount (g) | | | | | Feeding Composition (Molar Ratio) | | | Concentration of Solid Content (%) |
|---|---|---|---|---|---|---|---|---|---|
| | Sodium Aluminate | 48% NaOH | No. 3 Water Glass | Ion-Exchanged Water | Anhydrous Calcium Chloride | $SiO_2/Al_2O_3$ | $Na_2O/Al_2O_3$ | $CaO/Al_2O_3$ | |
| Example 9 | 320 | 168.8 | 355.6 | 727.2 | 1.96 | 2 | 3 | 0.02 | 23 |
| Comparative Example 4 | 320 | 168.8 | 355.6 | 723.9 | 0 | 2 | 3 | 0 | 23 |

TABLE 6

| | Composition of Product (Anhydride) (Molar Ratio) | | | | Cationic Exchange Properties (mg/g) | | Average Primary Particle Size X (μm) | Average Aggregate Particle Size Y (μm) | Dispersion Parameter (X × Y) | 20X/3 − 2.4 | Oil-Absorbing Ability (mL/100 g) | Crystal Form |
|---|---|---|---|---|---|---|---|---|---|---|---|---|
| | $SiO_2$ | $Na_2O$ | $Al_2O_3$ | CaO | Cationic Exchange Speed | Cationic Exchange Capacity | | | | | | |
| Example 9 | 2.02 | 1.15 | 1.0 | 0.019 | 180 | 215 | 1.3 | 3.3 | 4.3 | 6.3 | 59 | A-type zeolite |
| Comparative Example 4 | 2.05 | 1.05 | 1.0 | 0 | 90 | 198 | 2.2 | 16.2 | 35.6 | 12.3 | 98 | A-type zeolite |

Each of apparatus for preparing zeolite used in Examples 10 to 15 will be explained below based on the apparatus schematically shown in FIGS. 1 to 4. Fine zeolite particles were synthesized in an apparatus as shown in each figure, wherein the apparatus comprises a reaction tank equipped with an agitator and an external circulating line having a mixer arranged part of the way. A raw material tank, a feed line, a circulating line and a reaction tank illustrated in each figure can be appropriately temperature-controlled, but the devices for the temperature control are not illustrated therein.

An apparatus shown in FIG. 1 comprises an 80-L stainless reaction tank 3 equipped with an external circulating line 6 having a mixer 5 (line mill; commercially available from Tokushu Kika Kogyo Co. Ltd., Model: LM-S). A liquid can be conveyed to the circulating line 6 with a liquid-conveying pump 9 (commercially available from Dydo Metal Co. Ltd., WP pump, Model: WP2SS042C0) from the reaction tank 3. Raw materials can be fed to a position immediately before the inlet of the mixer 5 via a feed line 7 and a feed line 8, respectively, from a raw material tank 1 and a raw material tank 2 (both are 80-L stainless tanks). In addition, raw materials can be independently fed from the raw material tank 1 and the raw material tank 2, respectively, into the circulating line 6. The reaction tank 3 was equipped with an agitator 4 (used at a rotational speed of 100 rpm for actual use) having agitation impellers with a diameter of 210 mm. Each of the raw material tank 1 and the raw material tank 2 was also equipped with the same agitator as above (not illustrated in FIG. 1).

Figure 2:
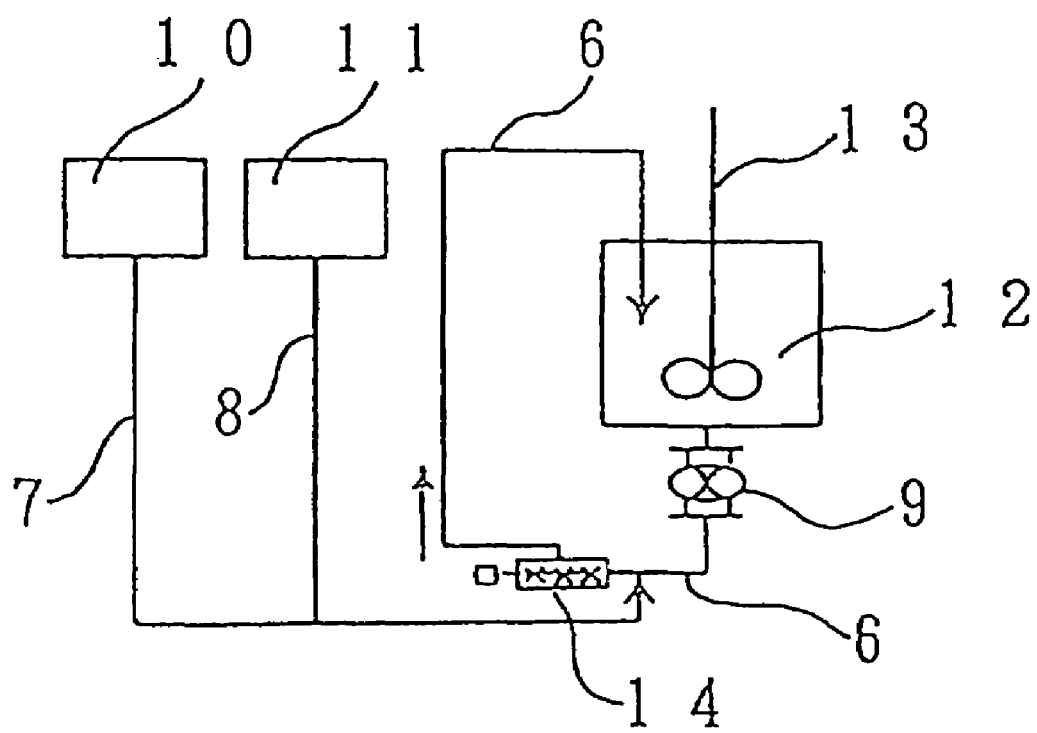
FIG. 2 is a schematic view showing another embodiment of an apparatus for preparing fine zeolite particles according to the present invention.

An apparatus shown in FIG. 2 is constructed so that line-mixing of raw materials can be carried out in advance at confluence of a feed line 7 and a feed line 8 before raw materials are fed from a raw material tank 10 and a raw material tank 11 into a circulating line 6 via the feed line 7 and the feed line 8, respectively. Alternatively, only one of the raw material tanks can be also used. A liquid in the circulating line 6 can be conveyed with a liquid-conveying pump 9 (commercially available from Dydo Metal Co. Ltd., WP pump, Model: WP3WL140C0) from a reaction tank 12. Each of the raw material tank 10 and the raw material tank 11 was a 200-L stainless tank, the reaction tank 12 was a 350-L stainless tank having an inner diameter of 750 mm, and a mixer 14 was a line mixer (commercially available from Tokushu Kika Kogyo Co. Ltd., Model: 2S6). An agitator (used at a rotational speed of 100 rpm for actual use) having agitation impellers with a diameter of 210 mm was arranged in each of the raw material tank 10 and the raw material tank 11, and an agitator 13 (used at a rotational speed of 100 rpm for actual use) comprising one each of a pitch paddle and an anchor paddle, each having a diameter of 500 mm was arranged in the reaction tank 12. Here, the agitators for the raw material tank 10 and the raw material tank 11 are not illustrated in FIG. 2.

Figure 3:
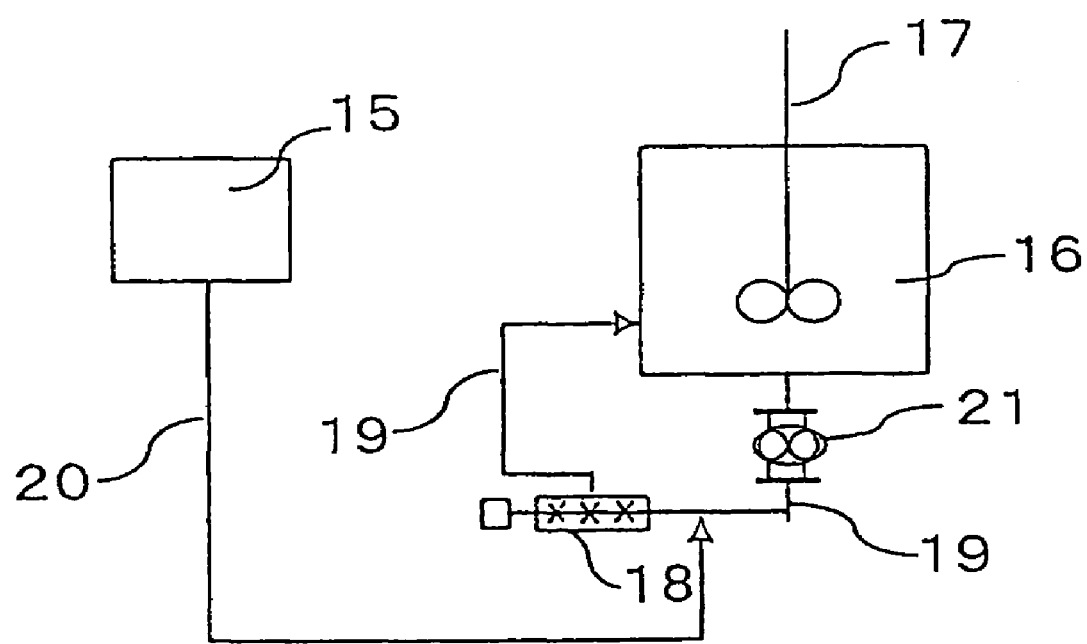
FIG. 3 is a schematic view showing still another embodiment of an apparatus for preparing fine zeolite particles according to the present invention.

An apparatus shown in FIG. 3 comprises a 200-L stainless reaction tank 16 equipped with an external circulating line 19 having a mixer 18. A liquid can be conveyed to the circulating line 19 with a liquid-conveying pump 21 (commercially available from Dydo Metal Co. Ltd., WP pump, Model: WP2SS040C0) from the reaction tank 16. A raw material can be fed to a position immediately before the inlet of the mixer 18 (line mixer; commercially available from Tokushu Kika Kogyo Co. Ltd., Model: 2S6) via a feed line 20 from a raw material tank 15 (200-L stainless tank). In addition, an agitator 17 (used at a rotational speed of 100 rpm for actual use) having max-blend type agitation impellers with a diameter of 340 mm was arranged in the reaction tank 16. An agitator (used at a rotational speed of 100 rpm for actual use) having agitation impellers with a diameter of 210 mm (not illustrated in FIG. 3) was arranged in the raw material tank 15.

Figure 4:
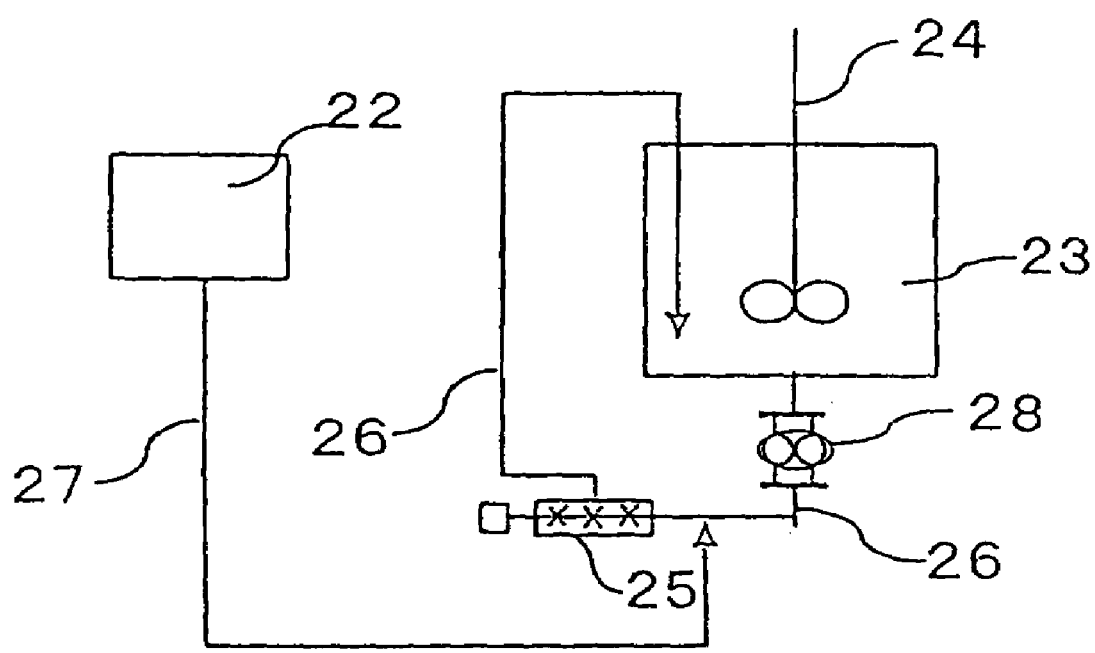
FIG. 4 is a schematic view showing still another embodiment of an apparatus for preparing fine zeolite particles according to the present invention.

An apparatus shown in FIG. 4 comprises a 350-L stainless reaction tank 23 equipped with an external circulating line 26 having a mixer 25. A liquid can be conveyed to the circulating line 26 with a liquid-conveying pump 28 (commercially available from Dydo Metal Co. Ltd., WP pump, Model: WP3WL140C0) from the reaction tank 23. A raw material can be fed to a position immediately before the inlet of the mixer 25 (line mixer; commercially available from Tokushu Kika Kogyo Co. Ltd. Model: 2S6) via a feed line 27 from a raw material tank 22 (200-L stainless tank). In addition, an agitator 24 (used at a rotational speed of 100 rpm for actual use) comprising one each of a pitch paddle and an anchor paddle, each having a diameter of 500 mm, was arranged in the reaction tank 23. An agitator (used at a rotational speed of 100 rpm for actual use) having agitation impellers with a diameter of 210 mm (not illustrated in FIG. 4) was arranged in the raw material tank 22.

According to each of the apparatus shown in FIGS. 1 to 4, a liquid conveyed from a reaction tank to a circulating line is again returned to the reaction tank. In the apparatus shown in FIG. 3, it is seen from the figure that a liquid is returned from a side wall of the reaction tank into the reaction tank, thereby allowing the liquid to be diffused into a liquid in the reaction tank. On the other hand, in the apparatus shown in FIGS. 1, 2, and 4, a liquid conveyed from the reaction tank is returned from a top of the reaction tank through the circulating line, thereby allowing the liquid to be diffused into a liquid in the reaction tank.

EXAMPLE 10

The apparatus shown in FIG. 1 was used. No. 3 water glass was placed in a raw material tank 1; and a 48% aqueous sodium hydroxide and sodium aluminate were placed in a raw material tank 2; and further, a 35% calcium chloride solution and ion-exchanged water were placed in a reaction tank 3. The contents in each tank were heated to 50° C. with agitation until they became homogeneous. While the calcium chloride solution in the reaction tank 3 was conveyed with a liquid-conveying pump 9 in advance to a circulating line 6 with operating an agitator 4, the reaction was carried out by simultaneously feeding a silica source (water glass) in the raw material tank 1 and an aluminum source (a sodium aluminate solution comprising a 48% aqueous sodium hydroxide and sodium aluminate) in the raw material tank 2 into the circulating line 6 via a feed line 7 and a feed line 8 over 2.2 minutes. During the reaction, a mixer 5 was operated at a rotational speed of 1800 rpm. After the termination of the reaction, the circulation of the resulting slurry was stopped. Thereafter, the slurry was heated to 80° C., and aged in this state for 1.5 hours. The resulting slurry was filtered and washed with water until the pH of the filtrate attained to 11.4. Thereafter, the resulting residue was dried, to give zeolite powder. The feeding conditions and the reaction conditions are shown in Table 7, and the composition and the properties of the resulting zeolite are shown in Table 8. An $Na_2O/H_2O$ molar ratio was 0.04.

EXAMPLE 11

The apparatus shown in FIG. 2 was used. No. 3 water glass was placed in a raw material tank 10; a 35% calcium chloride solution and ion-exchanged water were placed in a raw material tank 11; and a 48% aqueous sodium hydroxide and sodium aluminate were placed in a reaction tank 12. The contents in each tank were heated to 50° C. with agitation until they became homogeneous. While an aluminum source (a sodium aluminate solution comprising a 48% aqueous sodium hydroxide and sodium aluminate) in the reaction tank 12 was conveyed with a liquid-conveying pump 9 in advance to a circulating line 6 with operating an agitator 13, the reaction was carried out by simultaneously feeding a silica source (water glass) in the raw material tank 10 and the calcium chloride solution in the raw material tank 11 into the circulating line 6 via a feed line 7 and a feed line 8 over 4 minutes. During the reaction, a mixer 14 was operated at a rotational speed of 3600 rpm. While the resulting slurry was continued to be circulated in the circulating line 6 even after the termination of the reaction, the slurry was heated to 80° C., and aged for 1.5 hours with keeping the slurry at 80° C. The resulting slurry was filtered and washed with water until the pH of the filtrate attained to 11.4. Thereafter, the resulting residue was dried, to give zeolite powder. The feeding conditions and the reaction conditions are shown in Table 7, and the composition and the properties of the resulting zeolite are shown in Table 8. An $Na_2O/H_2O$ molar ratio was 0.06.

EXAMPLE 12

The apparatus shown in FIG. 2 was used. A 48% aqueous sodium hydroxide and sodium aluminate were placed in a raw material tank 10; a 35% calcium chloride solution and ion-exchanged water were placed in a raw material tank 11; and No. 3 water glass was placed in a reaction tank 12. The contents in each tank were heated to 50° C. with agitation until they became homogeneous. While a silica source (water glass) in the reaction tank 12 was conveyed with a liquid-conveying pump 9 in advance to a circulating line 6 with operating an agitator 13, the reaction was carried out by simultaneously feeding an aluminum source (a sodium aluminate solution comprising a 48% aqueous sodium hydroxide and sodium aluminate) in the raw material tank 10 and the calcium chloride solution in the raw material tank 11 into the circulating line 6 via a feed line 7 and a feed line 8, respectively, over 7 minutes. During the reaction, a mixer 14 was operated at a rotational speed of 3600 rpm. While the resulting slurry was continued to be circulated in the circulating line 6 even after the termination of the reaction, the slurry was heated to 80° C., and aged for 1.5 hours with keeping the slurry at 80° C. The resulting slurry was filtered and washed with water until the pH of the filtrate attained to 11.4. Thereafter, the resulting residue was dried, to give zeolite powder. The feeding conditions and the reaction conditions are shown in Table 7, and the composition and the properties of the resulting zeolite are shown in Table 8. An $Na_2O/H_2O$ molar ratio was 0.06.

EXAMPLE 13

The synthesis of zeolite was carried out without using calcium chloride in the same manner as in Example 12. The feeding conditions and the reaction conditions are shown in Table 7, and the composition and the properties of the resulting zeolite are shown in Table 8.

EXAMPLE 14

The apparatus shown in FIG. 3 was used. No. 3 water glass was placed and agitated in a raw material tank 15. Thereafter, a calcium chloride solution obtained by mixing in advance a 35% calcium chloride solution with ion-exchanged water was added to the raw material tank 15 over 1 minute, and thereafter the resulting mixture was heated to 50° C. Next, sodium aluminate and a 48% aqueous sodium hydroxide were placed in a reaction tank 16 while operating an agitator 17, and the resulting mixture was heated to 50° C. After heating, while an aluminum source (a sodium aluminate solution comprising sodium aluminate and a 48% aqueous sodium hydroxide) was circulated in a circulating line 19 with a liquid-conveying pump 21, the reaction was carried out by feeding a silica source (a water glass solution comprising No. 3 water glass and the calcium chloride solution) in the raw material tank 15 into the circulating line 19 via a feed line 20 over 3.5 minutes. During the reaction, a mixer 18 was operated at a rotational speed of 3600 rpm. While the resulting slurry was continued to be circulated in the circulating line 19 even after the termination of the reaction, the slurry was heated to 80° C., and aged for 2 hours with keeping the slurry at 80° C. The resulting slurry was filtered and washed with water until the pH of the filtrate attained to 11.4. Thereafter, the resulting residue was dried, to give zeolite powder. The feeding conditions and the reaction conditions are shown in Table 7, and the composition and the properties of the resulting zeolite are shown in Table 8. An $Na_2O/H_2O$ molar ratio was 0.06.

EXAMPLE 15

The apparatus shown in FIG. 4 was used. No. 3 water glass was placed and agitated in a raw material tank 22, and subsequently a 48% aqueous sodium hydroxide was placed in the raw material tank 22. Thereafter, a calcium chloride solution obtained by mixing in advance a 35% calcium chloride solution with ion-exchanged water was added thereto over 1 minute, and the resulting mixture was heated to 50° C. Next, sodium aluminate was placed in a reaction tank 23 while operating an agitator 24, and heated to 50° C. After heating, while an aluminum source (sodium aluminate) was circulated in a circulating line 26 with a liquid-conveying pump 28, the reaction was carried out by feeding a silica source (a water glass solution comprising No. 3 water glass, the 48% aqueous sodium hydroxide and the calcium chloride solution) in the raw material tank 22 into the circulating line 26 via a feed line 27 over 8 minutes. During the reaction, a mixer 25 was operated at a rotational speed of 2400 rpm. While the resulting slurry was continued to be circulated in the circulating line 26 even after the termination of the reaction, the slurry was heated to 80° C., and aged for 1 hour with keeping the slurry at 80° C. The resulting slurry was filtered and washed with water until the pH of the filtrate attained to 11.4. Thereafter, the resulting residue was dried, to give zeolite powder. The feeding conditions and the reaction conditions are shown in Table 7, and the composition and the properties of the resulting zeolite are shown in Table 8. An $Na_2O/H_2O$ molar ratio was 0.06.

TABLE 7

| | Examples | | | | | |
|---|---|---|---|---|---|---|
| | 10 | 11 | 12 | 13 | 14 | 15 |
| | Feeding Amount (kg) | | | | | |
| Sodium Aluminate | 15 | 50.3 | 95 | 95 | 50.0 | 95 |
| 48% NaOH | 8.0 | 26.0 | 28.2 | 28.2 | 26.4 | 28.2 |
| No. 3 Water Glass | 16.7 | 55.6 | 105.6 | 105.6 | 55.6 | 105.6 |
| Ion-Exchanged | 37.2 | 55.7 | 70.5 | 71.5 | 55.7 | 70.5 |

TABLE 7-continued

| | Examples | | | | | |
|---|---|---|---|---|---|---|
| | 10 | 11 | 12 | 13 | 14 | 15 |
| Water | | | | | | |
| 35% Calcium Chloride Solution | 0.29 | 0.88 | 1.67 | 0 | 0.88 | 1.67 |
| Feeding Composition (Molar Ratio) | | | | | | |
| $SiO_2/Al_2O_3$ | 2 | 2 | 2 | 2 | 2 | 2 |
| $Na_2O/Al_2O_3$ | 3 | 3 | 2.5 | 2.5 | 3 | 2.5 |
| $CaO/Al_2O_3$ | 0.02 | 0.02 | 0.02 | 0 | 0.02 | 0.02 |
| Reaction Conditions | | | | | | |
| Concentration of Solid Content (%) | 30 | 30 | 33 | 33 | 30 | 33 |
| Mixing Ratio (Molar Ratio)* | 1.9 | 1.4 | 1.0 | 0.58 | 1.5 | 0.59 |
| Circulating Flow Rate (kg/min) | 11.4 | 21.6 | 36.2 | 40.4 | 27 | 40.2 |
| Reaction Time (min) | 2.2 | 4 | 7 | 8.1 | 3.5 | 8 |

*Molar ratio of $SiO_2/Al_2O_3$ in a circulating line

Test Example

Each of fine zeolite particles obtained in Example 1 and Example 15 was compared with zeolite obtained in Comparative Example 1 by the method described below for the effect on the detergency of the detergent composition when the fine zeolite particles were used for the detergent composition.

Preparation of Artificially Soiled Cloth

An artificial soil solution having the following composition was smeared to a cloth to prepare an artificially soiled cloth. The smearing of the artificial soil solution to a cloth was carried out by printing the artificial soil solution on a cloth using a gravure roll coater made in accordance with Japanese Patent Laid-Open No. Hei 7-270395. The process for smearing the artificial soil solution to a cloth to prepare an artificially soiled cloth was carried out under the conditions of a cell capacity of a gravure roll of 58 $cm^3/cm^2$, a coating speed of 1.0 m/min, a drying temperature of 100° C., and a drying time of one minute. As to the cloth, #2003 calico (commercially available from Tanigashira Shoten) was used.

TABLE 8

| | Composition of Product (Anhydride) (Molar Ratio) | | | | Cationic Exchange Properties (mg/g) | | Average Primary Particle Diameter | Average Aggregate Particle Diameter | Dispersion Parameter | 20X/ | Oil-Absorbing Ability | Crystal Form |
|---|---|---|---|---|---|---|---|---|---|---|---|---|
| | $SiO_2$ | $Na_2O$ | $Al_2O_3$ | $CaO$ | Cationic Exchange Speed | Cationic Exchange Capacity | X (μm) | Y (μm) | (X × Y) | 3 − 2.4 | (mL/100 g) | |
| Example 10 | 2.04 | 1.06 | 1.00 | 0.021 | 191 | 220 | 1.3 | 11 | 14.3 | 6.3 | 82 | A-type zeolite |
| Example 11 | 2.04 | 1.06 | 1.00 | 0.017 | 194 | 216 | 1.3 | 3.3 | 4.3 | 6.3 | 58 | A-type zeolite |
| Example 12 | 2.04 | 1.05 | 1.00 | 0.017 | 186 | 216 | 0.8 | 4.1 | 3.3 | 2.9 | 85 | A-type zeolite |
| Example 13 | 2.04 | 1.07 | 1.00 | 0 | 177 | 216 | 1.5 | 7.6 | 11.4 | 7.6 | 85 | A-type zeolite |
| Example 14 | 2.03 | 1.09 | 1.00 | 0.02 | 205 | 220 | 0.79 | 5.9 | 4.7 | 2.9 | 70 | A-type zeolite |
| Example 15 | 2.05 | 1.07 | 1.00 | 0.02 | 199 | 223 | 0.74 | 7.2 | 5.3 | 2.5 | 87 | A-type zeolite |

In comparison to Comparative Examples 1 to 4, it is seen from Examples 1 to 15 that, according to the process for preparing the fine zeolite particles of the present invention, A-type zeolite having a very fine average primary particle size, being excellent in the oil-absorbing ability and the cationic exchange properties, and having a very fine average aggregate particle size can be obtained. In addition, it is seen from the comparison of Examples 1 to 9 with Examples 10 to 12 and Examples 14 and 15, that a combination of the first embodiment and the second embodiment of the process for preparing the fine zeolite particles of the present invention is preferable, from the viewpoint of further improvements in the cationic exchange properties and the oil-absorbing ability. Further, it is seen from the comparison with Examples 14 and 15 that it is particularly preferable to add in advance an alkaline earth metal-containing compound to a silica source from the viewpoint of making the average primary particle size very fine.

(Composition of Artificial Soil Solution)

The composition of the artificial soil solution was as follows: Lauric acid: 0.44%, myristic acid: 3.09%, pentadecanoic acid: 2.31%, palmitic acid: 6.18%, heptadecanoic acid: 0.44%, stearic acid: 1.57%, oleic acid: 7.75%, triolein: 13.06%, n-hexadecyl palmitate: 2.18%, squalene: 6.53%, liquid crystalline product of lecithin, from egg (commercially available from Wako Pure Chemical Industries): 1.94%, Kanuma red clay for gardening: 8.11%, carbon black (commercially available from Asahi Carbon Co.): 0.01%, and tap water: balance.

Washing Conditions and Evaluation Method (Composition of Detergent Composition)

Each of the composition of the detergent composition was as follows. Fine zeolite particles of Example 1 or 15, or Comparative Example 1: 25%, LAS-Na [one prepared by mixing LAS precursor (NEOPELEX FS, commercially available from Kao Corporation) with a 48% aqueous sodium hydroxide as a neutralizing agent]: 15%, polyoxyethylene alkyl ether [EMULGEN 108 KM; average mole of ethylene oxide (EO)=8.5, commercially available from Kao Corporation]: 8%, sodium carbonate (DENSE ASH, commercially available from Central Glass Co., Ltd.): 15%, sodium sulfate (neutral anhydrous sodium sulfate, commercially available from Shikoku Kasei K.K.): 17%, sodium sulfite (sodium sulfite, commercially available from Mitsui Toatsu K.K.): 1%, sodium polyacrylate (weight-average molecular weight: 10000, commercially available from Kao Corporation): 4%, and a crystalline silicate (SKS-6, commercially available from Clariant-Tokuyama K.K.): 15%.

The amount 2.2 kg of clothes (underwear and dress shirt in a proportion of 7:3) were prepared. Next, those referred to as "soiled support clothes" were prepared by sewing 10 pieces of the artificially soiled clothes of 10 cm×10 cm onto 3 pieces of cotton support clothes of 35 cm×30 cm. Washing was carried out by evenly placing the clothes and the soiled support clothes in a washing machine "AISAIGO (registered trademark) NA-F70AP" commercially available from Matsushita Electric Industrial Co., Ltd., and adding 20 g of the above detergent composition to the washing machine. The washing conditions are as follows.

Washing course: standard course;
  concentration of detergent composition: 0.067%;
  water hardness: 4° DH;
  water temperature: 10° C.; and
  liquor ratio: 20 L/kg.

The detergency (%) was determined by measuring the reflectances at 550 nm of the unsoiled cloth and the soiled cloth before and after washing by an automatic recording calorimeter (commercially available from Shimadzu Corporation), and taking an average value of 10 pieces.

$$\text{Detergency (\%)} = \frac{\text{Reflectance of Solid Cloth After Washing} - \text{Reflectance of Solid Cloth Before Washing}}{\text{Reflectance of Unsoiled Cloth} - \text{Reflectance of Solid Cloth Before Washing}} \times 100$$

As a result, the detergency of the detergent composition comprising the fine zeolite particles of Example 1 was 42%, and the detergency of the detergent composition comprising the fine zeolite particles of Example 15 was 48%. On the other hand, the detergency of the detergent composition in which the fine zeolite particles of Comparative Example 1 were formulated was as low as 29%. Therefore, it is found that the detergent compositions comprising the fine zeolite particles of Example 1 and Example 15 were more excellent in the detergency over that of Comparative Example 1. It is seen from these results that when using the fine zeolite particles obtained according to the process for preparing the fine zeolite particles of the present invention for a detergent composition, the detergency of the composition is markedly increased.

INDUSTRIAL APPLICABILITY

According to the process for preparing fine zeolite particles of the present invention, there can be efficiently obtained fine zeolite particles comprising a crystalline aluminosilicate, the fine zeolite particles having a very fine average primary particle size, being excellent in the oil-absorbing ability and cationic exchange properties, having a very fine average aggregate particle size, and being excellent in the dispersibility. In addition, there can be obtained a detergent composition comprising the above fine zeolite particles, the detergent composition being excellent in the detergency.

EQUIVALENT

Those skilled in the art will recognize, or be able to ascertain using simple routine experimentation, many equivalents to the specific embodiments of the invention described in the present specification. Such equivalents are intended to be encompassed in the scope of the present invention as recited in the following claims.

The invention claimed is:

1. A process for preparing fine zeolite particles comprising reacting a silica source with an aluminum source by feeding for reaction an aluminum source and/or a silica source directly into a circulating line which connects an outlet for a reaction tank and an inlet of a mixer.

2. The process according to claim 1, wherein the aluminum source is supplied to the reaction tank and circulated into the circulating line, and wherein the silica source is fed directly into the circulating line.

3. The process according to claims 1 or 2, wherein the aluminum source and the silica source are mixed in the circulating line at a mixing ratio of 0.1 to 3, as expressed by an $SiO_2/Al_2O_3$ molar ratio.

4. The process according to claims 1 or 2, wherein the fine zeolite particles have an average primary particle size of 1.5 μm or less.

5. The process according to claims 1 or 2, wherein the fine zeolite particles have the general formula in anhydride form:

$xM_2O.ySiO_2.Al_2O_3.zMeO$, wherein M is an alkali metal; Me is an alkaline earth metal; x is a number of 0.2 to 2; y is a number of 0.5 to 6; and z is a number of 0.005 to 0.1.

6. The process according to claims 1 or 2, wherein the fine zeolite particles have a cationic exchange speed of 150 mg $CaCO_3/g$ or more.

7. The process of claims 1 or 2, wherein said fine zeolite particles have an average primary particle size of 0.2 μm to 1.5 μm.

8. The process of claims 1 or 2, wherein said fine zeolite particles have an average aggregate particle size of 13 μm or less.

9. The process of claims 1 or 2, wherein said fine zeolite particles have an average aggregate particle size of 1 to 5 μm.

10. The process of claims 1 or 2, wherein said fine zeolite particles have a dispersion parameter of 7 or less.

11. The process of claims 1 or 2, wherein said fine zeolite particles have a dispersion parameter of 0.1 to 5.

* * * * *